US010432400B2

(12) United States Patent
Nair et al.

(10) Patent No.: US 10,432,400 B2
(45) Date of Patent: Oct. 1, 2019

(54) METHOD AND SYSTEM FOR PRIVACY PRESERVING DISCLOSURE OF A SHARED, IDENTITY LINKED SECRET

(71) Applicant: Southern Methodist University, Dallas, TX (US)

(72) Inventors: Sukumaran Nair, Dallas, TX (US); Raymond Dwight Horne, Jr., Greenville, TX (US)

(73) Assignee: Southern Methodist University, Dallas, TX (US)

( * ) Notice: Subject to any disclaimer, the term of this patent is extended or adjusted under 35 U.S.C. 154(b) by 152 days.

(21) Appl. No.: 15/791,131

(22) Filed: Oct. 23, 2017

(65) Prior Publication Data
US 2018/0219677 A1  Aug. 2, 2018

Related U.S. Application Data

(60) Provisional application No. 62/412,627, filed on Oct. 25, 2016.

(51) Int. Cl.
*H04L 29/06* (2006.01)
*H04L 9/32* (2006.01)
(Continued)

(52) U.S. Cl.
CPC ............ *H04L 9/321* (2013.01); *H04L 9/0643* (2013.01); *H04L 9/0825* (2013.01);
(Continued)

(58) Field of Classification Search
CPC ............. H04L 63/0421; H04L 63/0442; H04L 9/0643; H04L 9/0869; H04L 9/321; H04L 9/3271
See application file for complete search history.

(56) References Cited

U.S. PATENT DOCUMENTS 8,032,747 B2   10/2011  Patrick
9,712,565 B2 *  7/2017  Cheng ................. G06F 21/6218
(Continued)

FOREIGN PATENT DOCUMENTS

EP   2120393 A1   11/2009

OTHER PUBLICATIONS

Aumann, Y., et al., "Security Against Covert Adversaries: Efficient Protocols for Realistic Adversaries," Journal of Cryptology 23, 2, Apr. 2010, pp. 281-343.
(Continued)

*Primary Examiner* — Amir Mehrmanesh
(74) *Attorney, Agent, or Firm* — Daniel J. Chalker; Chalker Flores, LLP

(57) ABSTRACT

A method and system securely discloses a shared, identity linked secret known by two parties, while preserving the privacy of the parties. The first party generates a challenge value that only the second party could respond correctly to if and only if the second party shares secret S with the first party. The first party generates a counter-challenge for the challenge value, computes a verifier associated with the challenge and counter-challenge, and sends the counter-challenge to the server. The server sends the counter-challenge value to the second party. The second party computes a verifier associated with the challenge and counter-challenge, the verifier matches the verifier computed by the second party if and only if the second party shares secret S with the first party. The parties execute a gradual release process, which confirms a match if and only if the secret S is shared between the parties.

50 Claims, 8 Drawing Sheets

(51) Int. Cl.
*H04L 9/06* (2006.01)
*H04L 9/08* (2006.01)
*G06F 7/58* (2006.01)

(52) U.S. Cl.
CPC .......... *H04L 9/0869* (2013.01); *H04L 9/3271* (2013.01); *H04L 9/3273* (2013.01); *H04L 63/0421* (2013.01); *H04L 63/0442* (2013.01); *G06F 7/582* (2013.01); *G06F 7/588* (2013.01); *H04L 2209/46* (2013.01)

(56) References Cited

U.S. PATENT DOCUMENTS

| | | | |
|---|---|---|---|
| 2006/0212928 A1* | 9/2006 | Maino | H04L 9/0841 726/4 |
| 2008/0170701 A1* | 7/2008 | Matsuo | H04L 63/0442 380/281 |
| 2010/0107230 A1* | 4/2010 | Tyagi | H04L 63/08 726/6 |
| 2010/0262834 A1* | 10/2010 | Freeman | G06F 21/31 713/184 |
| 2017/0208463 A1* | 7/2017 | Brand | H04L 9/3271 |

OTHER PUBLICATIONS

Balfanz, D., et al., "Secret handshakes from pairing-based key agreements. In Security and Privacy," Feb. 28, 2003 IEEE, pp. 180-196.

Boudot, F., et al., "A fair and efficient solution to the socialist millionaires' problem," Discrete Applied Mathematics 111, No. 1, Jul. 2000, pp. 23-36.

Du, W., et al., "Secure multi-party computation problems and their applications: a review and open problems," In Proceedings of New Security Paradigms Workshop, Sep. 11-13, 2001, pp. 11-20.

Henecka, W., et al., "TASTY: tool for automating secure two-party computations," In Proceedings of the 17th ACM Conference on Computer and Communications Security, Oct. 4-8, 2010, pp. 451-462.

Lee, B., et al., "Secure matchmaking protocol," In Information Security and Cryptology—ICISC 2000, Dec. 8-9, 2000, pp. 123-134.

Rabin, M. O., "How to Exchange Secrets with Oblivious Transfer," IACR Cryptology ePrint Archive 2005:187.

Zhang, K. et al., "A private matchmaking protocol," 2001, available at http://citeseerx.ist.psu.edu/viewdoc/summary?doi=10.1.1.54.835.

* cited by examiner

700

702
Provide a communications system comprising an initiating client device (102A) and one or more receiving client devices (102B) communicably coupled to a server device (104).

704
Select two or more user identifiers (IDs) and a first random number ($R_A$) using the initiating client device ($102_A$), wherein the two or more user identifiers (IDs) include a target user (B).

706
Create a first encrypted data (C) by encrypting the first random number ($R_A$) with a private key ($PR_A$) associated with the initiating user (A) using the initiating client device ($102_A$).

708
Create a challenge (X) by encrypting the first encrypted data (C) and the private information (S) with a public key ($PU_B$) associated with the target user (B) using the initiating client device ($102_A$).

710
Send the challenge (X) and the two or more user identifiers (IDs) from the initiating client device ($102_A$) to the server device (104).

712
Make the challenge (X) available to each receiving client device ($102_B$) associated with the two or more user identifiers (IDs) using the server device (104).

714
Obtain a first information (S?) and a second encrypted data (F) by decrypting the challenge (X) with a private key ($PR_B$) associated with a receiving user (B) using the receiving client device ($102_B$), wherein the first information (S?) equals the private information (S) whenever the receiving user (B) is the target user (B).

METHOD AND SYSTEM FOR PRIVACY PRESERVING DISCLOSURE OF A SHARED, IDENTITY LINKED SECRET

CROSS-REFERENCE TO RELATED APPLICATIONS

This application is a non-provisional patent application of and claims priority to U.S. provisional patent application Ser. No. 62/412,627 filed on Oct. 25, 2016 and entitled "Method and System for Privacy Preserving Disclosure of a Shared, Identity Linked Secret", the contents of which are hereby incorporated by reference in their entirety.

TECHNICAL FIELD OF THE INVENTION

The present invention relates in general to the field of protecting information, and more particularly, to disclose a shared, identity linked secret while preserving the privacy of the discloser.

STATEMENT OF FEDERALLY FUNDED RESEARCH

None.

BACKGROUND OF THE INVENTION

Without limiting the scope of the invention, its background is described in connection with secure multi-party computation. There have been many initiatives to accomplish related tasks such as secure multi-party computation (SMC) [1-6], secret handshakes [7], oblivious transfer [8], and even patents for privacy-preserving shared document comparison [9] and shared secret verification [10]. There are also a number of matchmaking protocols that have been proposed and are more closely related to the problem at hand [11-16]. However, these initiatives do not directly pertain to the "Prom Problem" and identity linked wishes and/or they are vulnerable to significant attacks rendering them unable to afford security and privacy in that context. The "Prom Problem" is where the participants would like to ensure that either they both learn that they share the same identity linked secret (e.g., they want to go to the prom together) or that no party learns any useful information, not even that the other party inquired about a shared secret. The prior art protocols are not privacy preserving with identity linked secrets. Prior protocols lack fairness (joint notification with equivalent exchange) and are vulnerable to a variety of attacks in this context such as inference, impersonation, and privacy compromise in the event of communication or database compromise.

Accordingly, there is a need for a method and system to disclose a shared, identity linked secret while preserving the privacy of the discloser.

SUMMARY OF THE INVENTION

Various embodiments of methods and systems for privacy preserving disclosure of a shared, identity linked secret are described herein. For example, the method and system described herein provide a first party, Alice, with a risk-free, privacy preserving means for attempting to determine whether a second party, Bob, shares the same identity linked secret. Alice and Bob use Client devices to communicate with a Server application executing on a server device. No direct communication takes place between Alice and Bob.

Initially, Alice knows a secret and she would like to find out if Bob shares the same secret. In the simplest embodiment, Alice first computes a challenge that incorporates random data and secret S—one that only Bob could respond to correctly and only if he shares the same, identity linked secret. Alice then sends the challenge (X) and group identifier (GID) to the Server. At some point in time thereafter, the Server provides the challenge to Bob who decrypts it, considers with whom he might share secret S, and computes a counter-challenge (Y) along with a verifier value ($V_{AB}$) for confirmation. Next, Bob sends the counter-challenge (Y) to the Server. Alice queries the server for a counter-challenge for X, receives Y, and computes verifier $V_{AB}$. At this point, a gradual release process commences to fairly confirm it if there is indeed a shared, identity linked secret between the participating parties. Alternatively, neither party learns any useful information in the event that the secret is not shared. The protocol described herein utilizes an untrusted third party for the matchmaker database and identities or pseudo-identities are never directly included in any messages.

In one embodiment, a method of securely disclosing a shared, identity linked secret known by two parties, a first party A and a second party B, while preserving the privacy of the parties such that A and B only learn something if they do in fact share the same secret while a third party cannot learn any useful information is provided as follows:
1) The first party generating a challenge value that only the second party could respond correctly to if and only if the second party shares secret S with the first party;
2) The first party generating a counter-challenge for the challenge value and computing a verifier associated with the challenge and counter-challenge;
3) The first party sending the counter-challenge to the server;
4) The server sending the counter-challenge value to the second party;
5) The second party computing a verifier associated with the challenge and counter-challenge, the verifier matching the verifier computed by the second party if and only if the second party shares secret S with the first party; and
6) The first party and the second party executing a Gradual Release process in which the verifier, or a subset thereof, is revealed one bit at a time in an alternating fashion, the Gradual Release process confirming a match if and only if the identity linked secret S is shared between the first party and the second party.

In another embodiment, a method for disclosing private information (S) includes the steps of:
1) providing a communications system comprising an initiating client device ($102_A$) and one or more receiving client devices ($102_B$) communicably coupled to a server device (104);
2) selecting two or more user identifiers (IDs) and a first random number ($R_A$) using the initiating client device ($102_A$), wherein the two or more user identifiers (IDs) include a target user (B);
3) creating a first encrypted data (C) by encrypting the first random number ($R_A$) with a private key ($PR_A$) associated with the initiating user (A) using the initiating client device ($102_A$);
4) creating a challenge (X) by encrypting the first encrypted data (C) and the private information (S) with a public key ($PU_B$) associated with the target user (B) using the initiating client device ($102_A$);

5) sending the challenge (X) and the two or more user identifiers (IDs) from the initiating client device ($102_A$) to the server device (104);

6) making the challenge (X) available to each receiving client device ($102_B$) associated with the two or more user identifiers (IDs) using the server device (104);

7) obtaining a first information (S?) and a second encrypted data (F) by decrypting the challenge (X) with a private key ($PR_B$) associated with a receiving user (B) using the receiving client device ($102_B$), wherein the first information (S?) equals the private information (S) whenever the receiving user (B) is the target user (B);

8) selecting a first user identifier (U) using the receiving client device ($102_B$);

9) obtaining a second random number (G) by decrypting the second encrypted data (F) with a public key ($PU_U$) associated with the first user identifier (U) using the receiving client device ($102_B$), wherein the second random number (G) equals the first random number ($R_A$) whenever the first user identifier (U) corresponds to the initiating user (A);

10) obtaining a first hash value (J) by applying a one-way hash function to the second random number (G) using the receiving client device ($102_B$);

11) selecting a third random number ($R_B$) using the receiving client device ($102_B$);

12) creating a third encrypted data (K) by encrypting the third random number ($R_B$) with a private key ($PR_B$) associated with the receiving user (B) using the receiving client device ($102_B$);

13) creating a counter-challenge (Y) by encrypting the third encrypted data (K) with a public key ($PU_U$) associated with the first user identifier (U) using the receiving client device ($102_B$);

14) creating a first verification value ($V_{AB}$) by concatenating the first hash value (J) and a second hash value $H(R_B)$ and then applying the one-way hash function using the receiving client device ($102_B$), wherein the second hash value $H(R_B)$ comprises the one-way hash function applied to the third random number ($R_B$);

15) sending the counter-challenge (Y) and the challenge (X) from the receiving client device ($102_B$) to the server device (104);

16) making the counter-challenge (Y) available to the initiating client device (A) using the server device (104);

17) obtaining a fourth encrypted data (L) by decrypting the counter-challenge (Y) with a private key ($PR_A$) associated with the initiating user (A) using the initiating client device ($102_A$), wherein the fourth encrypted data (L) equals the third encrypted data (K) whenever the first user identifier is associated with the initiating user (A);

18) obtaining a fourth random number (N) by decrypting the fourth encrypted data (L) with a public key ($PU_B$) associated with the target user (B) using the initiating client device ($102_A$);

19) obtaining a third hash value (P) by applying the one-way hash function to the fourth random number (N) using the initiating client device ($102_A$);

20) creating a second verification value ($V_{AB}$) by concatenating the third hash value (P) and a fourth hash value $H(R_A)$ and then applying the one-way hash function using the initiating client device ($102_A$), wherein the fourth hash value $H(R_A)$ comprises the one-way hash function applied to the first random number ($R_A$); and 21) determining whether the initiating user (A) and the target user (B) have shared the private information by comparing the first verification value ($V_{AB}$) to the second verification value ($V_{AB}$) using the initiating client device ($102_A$), the receiving client device ($102_B$) and the server device (104).

In another embodiment, a system for disclosing private information (S) includes an initiating client device ($102_A$) and one or more receiving client devices ($102_B$) communicably coupled to a server device (104). The initiating client device ($102_A$) selects two or more user identifiers (IDs) and a first random number ($R_A$) in which the two or more user identifiers (IDs) include a target user (B), creates a first encrypted data (C) by encrypting the first random number ($R_A$) with a private key ($PR_A$) associated with the initiating user (A), creates a challenge (X) by encrypting the first encrypted data (C) and the private information (S) with a public key ($PU_B$) associated with the target user (B), and sends the challenge (X) and the two or more user identifiers (IDs) to the server device (104). The server device (104) makes the challenge (X) available to each receiving client device ($102_B$) associated with the two or more user identifiers (IDs). The receiving client device ($102_B$) obtains a first information (S?) and a second encrypted data (F) by decrypting the challenge (X) with a private key ($PR_B$) associated with a receiving user (B) in which the first information (S?) equals the private information (S) whenever the receiving user (B) is the target user (B), selects a first user identifier (U), obtains a second random number (G) by decrypting the second encrypted data (F) with a public key ($PU_U$) associated with the first user identifier (U) in which the second random number (G) equals the first random number ($R_A$) whenever the first user identifier (U) corresponds to the initiating user (A), obtains a first hash value (J) by applying a one-way hash function to the second random number (G), selects a third random number ($R_B$), creates a third encrypted data (K) by encrypting the third random number ($R_B$) with a private key ($PR_B$) associated with the receiving user (B), creates a counter-challenge (Y) by encrypting the third encrypted data (K) with a public key ($PU_U$) associated with the first user identifier (U), creates a first verification value ($V_{AB}$) by concatenating the first hash value (J) and a second hash value $H(R_B)$ and then applying the one-way hash function in which the second hash value $H(R_B)$ comprises the one-way hash function applied to the third random number ($R_B$), and sends the counter-challenge (Y) and the challenge (X) to the server device (104). The server device (104) makes the counter-challenge (Y) available to the initiating client device (A). The initiating client device ($102_A$) obtains a fourth encrypted data (L) by decrypting the counter-challenge (Y) with a private key ($PR_A$) associated with the initiating user (A) in which the fourth encrypted data (L) equals the third encrypted data (K) whenever the first user identifier is associated with the initiating user (A), obtains a fourth random number (N) by decrypting the fourth encrypted data (L) with a public key ($PU_B$) associated with the target user (B), obtains a third hash value (P) by applying the one-way hash function to the fourth random number (N) using the initiating client device ($102_A$), creates a second verification value ($V_{AB}$) by concatenating the third hash value (P) and a fourth hash value $H(R_A)$ and then applying the one-way hash function in which the fourth hash value $H(R_A)$ comprises the one-way hash function applied to the first random number ($R_A$). The initiating client device ($102_A$), the receiving client device ($102_B$) and the server device (104) determine whether the initiating user (A) and the target user (B) have shared the private information by comparing the first verification value ($V_{AB}$) to the second verification value ($V_{AB}'$).

The present invention is described in detail below with reference to the accompanying drawings.

BRIEF DESCRIPTION OF THE DRAWINGS

For a more complete understanding of the features and advantages of the present invention, reference is now made to the detailed description of the invention along with the accompanying figures and in which:

FIGS. 7A-7C is a flowchart illustrating a method or disclosing private information (S) in accordance with another embodiment of the present invention.

DETAILED DESCRIPTION OF THE INVENTION

Figure 1:
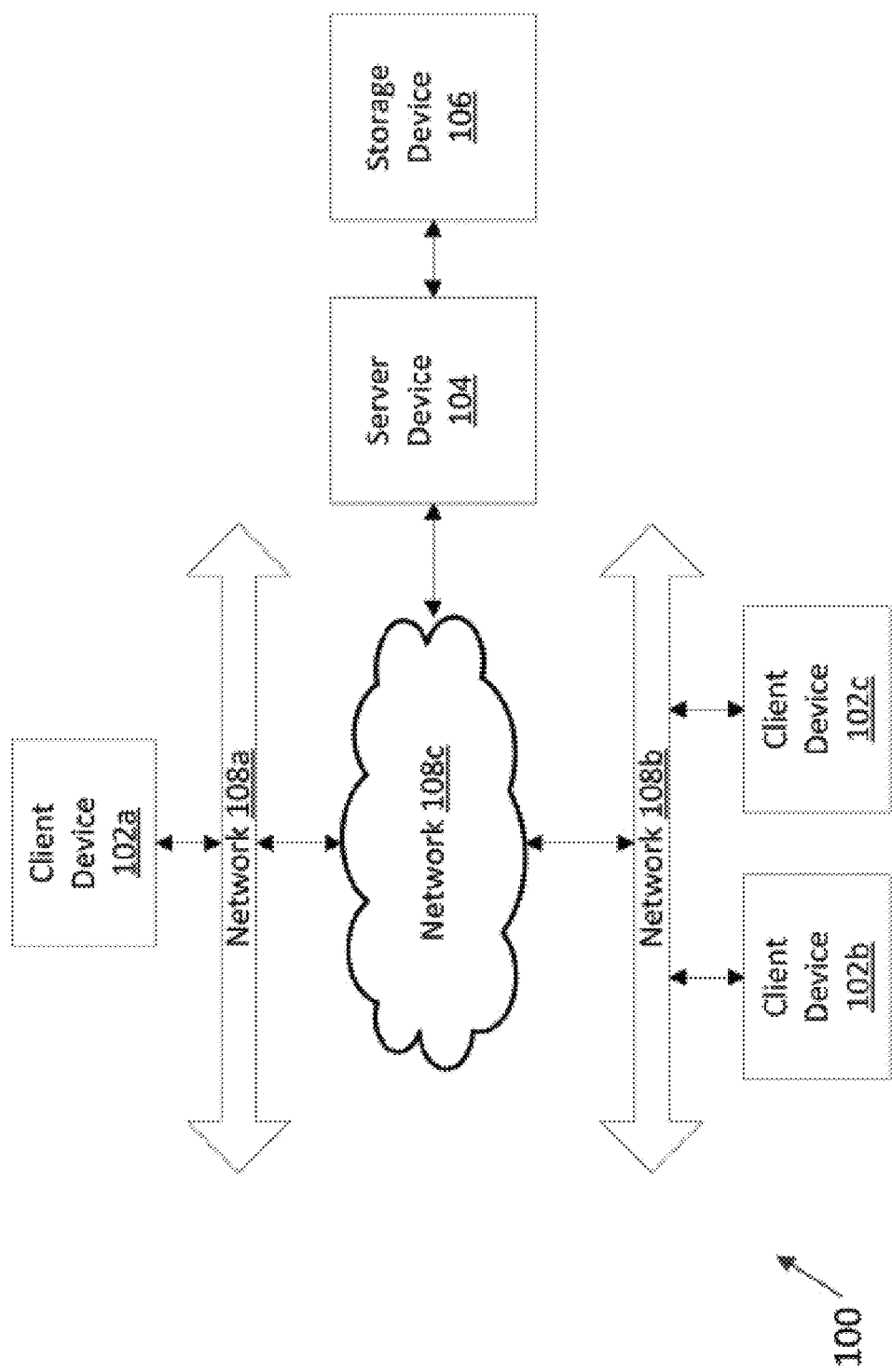
FIG. 1 is a block diagram of an example networked computing system in accordance with one embodiment of the present invention.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

The present disclosure is directed to systems and methods for solving the Prom Problem and disclosing a shared, identity linked secret while preserving the privacy of the parties involved. The various embodiments of the present invention are now described with references to the drawings, wherein like reference numerals are used to refer to like elements. The description that follows includes numerous specific details set forth in order to provide a thorough understanding of the claimed subject matter. However, the claimed subject matter may clearly be practiced without these specific details.

The most closely related matchmaking protocols are compared with the solution provided by the present invention in Table 1 below. At this time there are no known protocols that can provide security and privacy in the process of confirming shared, identity linked wishes/secrets as required in the Prom Problem. Two key elements of our approach that set it apart are the ability to provide fairness with an untrusted matchmaker and support for identity linked wishes.

TABLE 1

Comparison of Matchmaking Protocols

| Matchmaking Protocol | Protocol Properties | | | | | | | |
|---|---|---|---|---|---|---|---|---|
| | Wish Secrecy | Anonymity | Generic Wish Authentication | Fairness | Third Party | Dictionary Attack Resistance | Forward Privacy | Identity Linked Wishes |
| Baldwin/ Gramlish [11] | | | ✓ | ✓ | Trusted | | | |
| Meadows [12] | ✓ | | ✓ | | Trusted (Init. Only) | | | |
| Zhang/ Needham [14] | ✓ | ✓ | ✓ | | Untrusted | | | |
| Shin/ Gligor [16] | ✓ | ✓ | ✓ | | None | ✓ | ✓ | |
| Horne/ Nair | ✓ | ✓ | ✓ | ✓ | Untrusted | ✓ | ✓ | ✓ |

Now referring to FIG. 1, a block diagram of an example networked computing system 100 in accordance with one embodiment of the present invention is shown. The example environment 100 includes a plurality of client devices 102 *a-c* (collectively, client devices 102), a server device 104, and a storage device 106. The example networked computing environment 100 also includes a plurality of networks 108 *a-c* (collectively, networks 108). However, the system 100 is an example environment and other embodiments are possible as well. For instance, the networked computing environment 100 may generally include more or fewer devices, networks, and/or other components as desired.

The client devices 102 and the server device 104 are general purpose computing devices, such as described below with references to FIGS. 2 and 3. In example embodiments, the server device 104 can be on a local closed network, an intranet, or on larger wide area networks such as the global network known as the Internet. In some embodiments, the server device 104 includes a plurality of interconnected server devices operating together. Other embodiments of the server device 104 are possible.

The storage device 106 is a persistent data storage device such as a relational database, NoSQL database, or any other system supporting data storage and retrieval. The storage device 106 stores data in a predefined format such that the server device 104 can query, update, and manage data stored therein. Common examples of such data storage systems include systems with large storage capacities running software such as MySQL, CouchDB, Oracle®, Microsoft® SQL Server, or any other data storage software. In some embodiments, the storage device 106 includes a plurality of data storage devices logically grouped together in an interconnected configuration sometimes referred to as a "farm." In other embodiments, the storage device 106 may make use of a redundant array of independent disks (RAID) configuration. Other embodiments of the storage device 106 are also possible. In some embodiments, the storage device 106 may actually reside within the server device 104. In some embodiments, the data storage device may use an in-memory database rather than the primary and/or tertiary storage elements commonly used with most database management systems. In some embodiments of the storage device 106, a combination of in-memory, primary, and tertiary storage elements are utilized.

The network 108 is a bi-directional data communication path for data transfer between one or more devices. In the example embodiment 100, the first network 108a establishes a communication path for data transfer between the client device 102a and the server device 104 via network 108c. The second network 108b establishes a communication path for data transfer between the client devices 102b and 102c and with the server device 104 via the network 108c. Each of the different networks 108 may be composed of any number of wireless or wired local area network (LAN), wide area network (WAN), Internet, or other communication networks such that data transfer can occur between the elements of the example environment 100. Each of the various networks 108a, 108b, and 108c may display unique characteristics with respect to performance, security, quality of service, and other details so long as end-to-end communications may take place between devices on different networks as required. Other embodiments of the network 108 are possible.

Figure 2:
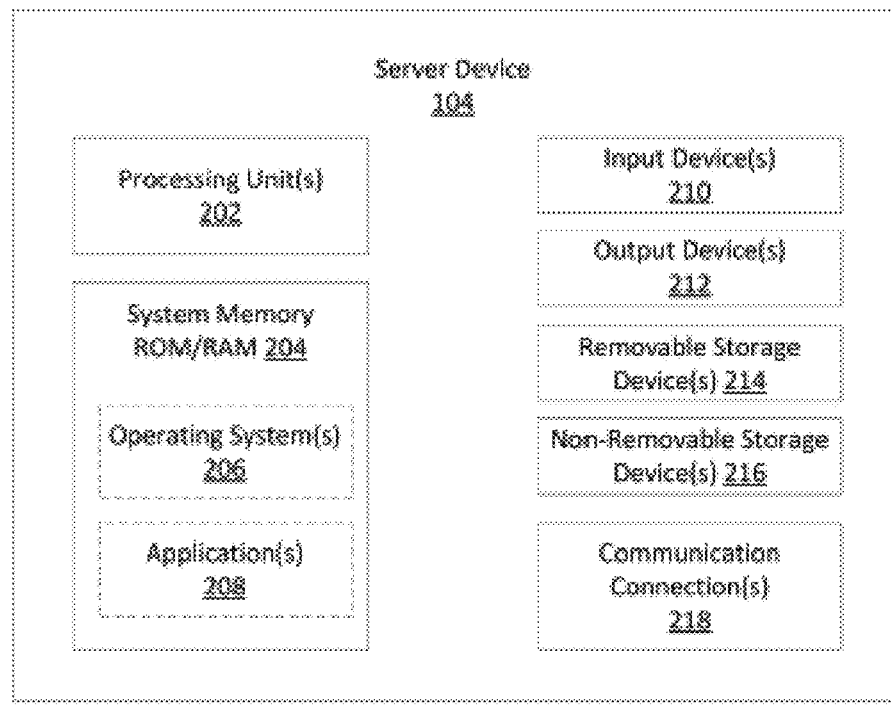
FIG. 2 is a block diagram of an example server device from the system of FIG. 1 in accordance with one embodiment of the present invention.

Referring now to FIG. 2, a block diagram of an example server device 104 from the system 100 of FIG. 1 in accordance with one embodiment of the present invention is shown. As mentioned previously, the server device 104 is a general purpose computing device. Non-limiting examples of general purpose computing devices include a desktop computer, rack server, laptop computer, smartphone, smartwatch, and other computing devices. The server device 104 includes at least one processing unit 202 and system memory 204. The system memory 204 can be used to store an operating system 206 to control the operation of the computing device. Non-limiting examples of common operating systems 206 include the Linux, Nginx, Android, iOS, and Microsoft Windows® operating systems. The system memory 204 may also be used to store software applications 208 along with application-related data. Software applications 208 may include a variety of types of programs such as an Internet web browser, an electronic mail program, a web server program, programs providing web services, and more. Other types of software applications are also possible.

The system memory 204 can include a plurality of computer readable media components which may include computer readable storage media and communications media. The removable storage 214 and non-removable storage 216 represent such additional storage. Computer readable storage media may include volatile and nonvolatile, removable and non-removable media using any technology or method for storage and retrieval of information such as data structures, computer instructions, program modules, and other data. Non-limiting examples of computer readable storage media can include RAM, ROM, EEPROM, flash memory, phase-change memory, resistive RAM, CD-ROM, DVD or other optical storage, magnetic cassettes, magnetic tape, magnetic disks or other magnetic storage devices, or any other medium which can be accessed by the server device 104 and used for storage and retrieval of the desired information. Computer readable storage media may be internal to the server 104, external, or a combination of the two.

Communication media may be in the form of computer readable instructions, data structures, program modules, or other data in a modulated data signal, such as a carrier wave or other transport mechanism, and includes any information delivery media. In a modulated data signal, information is encoded in the signal via changes in one or more characteristics of the signal. Non-limiting examples of communication media can include wired networks as well as wireless media such as radio frequency, acoustic, infrared, and any other wired or wireless technology whereby data can be encoded, transmitted, and decoded.

The server device 104 can have any number and type of input devices 210. Non-limiting examples of such input devices may include keyboard, mouse, touch-screen, speech recognition, and any other mechanism for providing input. The server device 104 can also have any number and type of output devices 212. Non-limiting examples of such output devices include a visual display, printer, speakers, and any other mechanism for providing output to man or machine. The server device 104 can further include a plurality of communication connections 218 configured to enable communications with other computing devices such as over a network similar to 108 in FIG. 1.

Figure 3:
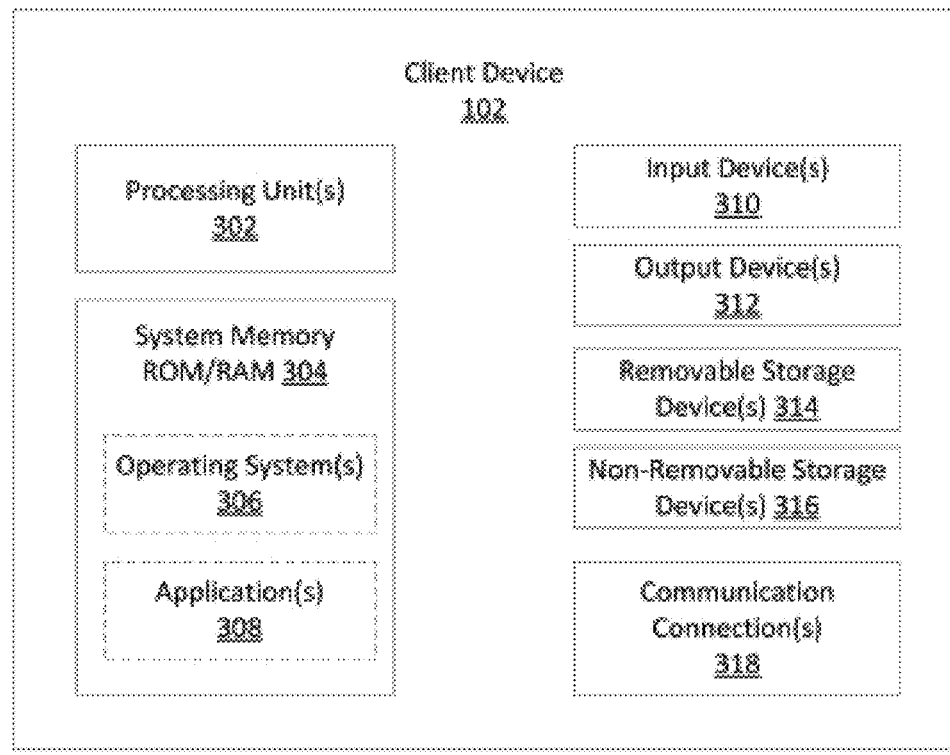
FIG. 3 is a block diagram of an example client device from the system of FIG. 1 in accordance with one embodiment of the present invention.

Referring now to FIG. 3, a block diagram of an example client device 102 from the system 100 of FIG. 1 in accordance with one embodiment of the present invention is shown. As example embodiments, the client devices 102 are general purpose computing devices that can be configured similar to the server device 104 as described above. The client devices 102 are also controlled by one or more operating systems 306 and configured to include one or more different types of software applications 308 that can interact with functionality and services of the server device 104. Non-limiting example software applications that may execute on a client device include a web access client, an email client, a word processing application, a personal digital assistant application, games, and more. Other types of software applications are also possible.

Software applications 208 on the server and software applications 308 on the client may also include an application written to implement portions of one or more embodiments of the presently disclosed process for privacy-preserving disclosure of a shared secret thus transforming the general purpose computing machines and interconnection networks into a novel, special purpose computing system to provide valuable and previously unavailable shared secret disclosure service to users.

Figure 4:
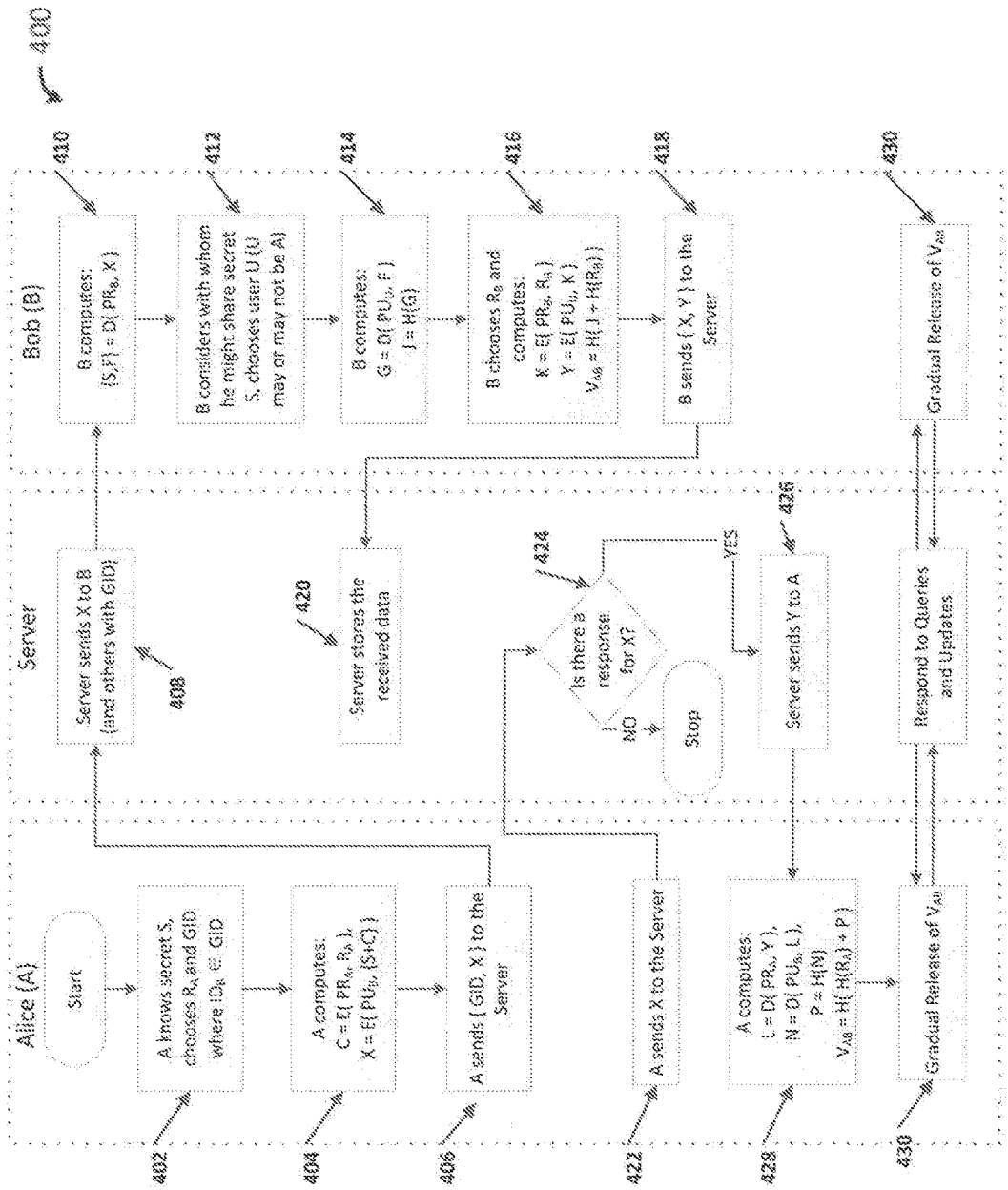
FIG. 4 is a flowchart illustrating a method of disclosing private information in accordance with one embodiment of the present invention.

Now referring to FIG. 4, a flowchart illustrating a method 400 of disclosing private information in accordance with one embodiment of the present invention is shown. The flowchart is divided into columns distinguishing the process steps performed by Alice and Bob, also referred to as A and B, using client devices 102 of the example system in FIG. 1 and the process steps performed by the Server using a server device 104 as in the example system of FIG. 1. In this context, Alice knows a generic secret S (e.g., "want to go to prom together") and she would like to find out if Bob shares that same secret without anyone finding out and without even Bob finding out that she inquired about a secret if he does not share the same secret. Note that "Alice and Bob want to attend prom together" is an identity linked secret. Although it can be easily guessed, the veracity of it is unknown until verified that both Alice and Bob know that secret (often referred to as having shared/common wishes in the literature).

In the first step 402, Alice chooses a random number RA. Common methods are readily available for producing random numbers such as pseudo-random number generators (PRNGs) typically offered by programming languages and operating systems. The rand( ) function in C++ is a common example of such a PRNG and due to its efficiency, something similar might be used in low security, resource constrained systems. However, in many or most contexts where the presently disclosed process might be applied, higher security would be desired so implementations would utilize a cryptographically secure pseudo-random number generator (CSPRNG). CSPRNGs offer improved security qualities but often require more computational or other resources. Non-limiting examples of such CSPRNGs are described in industry standards such as NIST SP 800-90A and ANSI X9.62-2005, Annex D. CSPRNG implementations are also readily available for many programming languages and operating systems. Alice also chooses the identifier GID associated with a group that includes Bob. The criteria for grouping could vary significantly depending on the context but examples include every male student in Alice's school or every student within a 30 mile radius. Details of group management are not essential to the invention and groups are not a requirement but a convenience to avoid all-to-all communication. Assuming groups are utilized, they could be managed in the Server device, with client devices in a peer-to-peer fashion, or entirely external to the system via an unrelated 3rd party.

In step 404, Alice encrypts $R_A$ with her private key $PR_A$ yielding C. Next, she encrypts the generic secret S along with C using Bob's public key $PU_B$ yielding a challenge for Bob denoted by X. Alice then sends X and the GID to the Server in step 406. Although implicit in the diagram, it should be apparent that in order for the process to succeed, the Server may store the X value until the exchange completes successfully, for a pre-determined period of time, or for a period of time specified by Alice in the case of Variation 12 discussed below. The storage mechanism utilized could be system memory 204 of a server device 104, via one or more removable storage devices 214, via one or more non-removable storage devices 216, in a storage device 106, or using any combination of those methods depending on factors such as maximum duration of storage and security requirements for the usage scenario.

In step 408, the Server sends the challenge X to Bob (and the others in the group identified by GID if groups are used). That communication could be initiated by Bob or by the Server as described in Variation 7 below. Note that Bob does not know who the challenge is from so if Bob does not share the same secret as the challenger (Alice in this instance), he cannot learn even that Alice has inquired about the secret.

Upon receipt of X from the Server, in step 410 Bob decrypts X with his private key $PR_B$ yielding S and F. Next, in step 412 Bob considers with whom he might share secret S. Bob chooses user U (that may or may not be Alice) and in step 414 he decrypts F with U's public key $PU_U$ yielding G. Note that if Bob decided he might share the secret S with Alice and he used her public key in that step, then G would be equivalent to $R_A$. Otherwise, G would be another random value. Either way, Bob cannot distinguish between the two and he still has not learned anything useful. Bob also computes J as the result from applying a one-way hash function to G. In step 416 Bob now prepares a counter-challenge by choosing random data RB and encrypting it with his private key $PR_B$ resulting in K. He then encrypts K with user U's public key $PU_U$ yielding the counter-challenge Y. At this time B can also compute the verification value $V_{AB}$ by concatenating J and $H(R_B)$ and then applying a one-way hash function. To complete this phase of the process, in step 418 Bob sends counter-challenge Y, and the challenge X that it is associated with, to the Server where the data are stored in step 420. Here again, the storage mechanism utilized could be system memory 204 of a server device 104, via one or more removable storage devices 214, via one or more non-removable storage devices 216, in a storage device 106, or using any combination of those methods depending on factors such as maximum duration of storage and security requirements for the usage scenario.

At some point thereafter, in step 422, A sends X to the Server to determine whether there is an associated response. If not, there is no further action needed although A may repeat step 422 periodically thereafter until a response is received or for a pre-determined period of time as in Variation 6 described below. But in the event that there is an associated counter-challenge, then the Server responds to the query by sending Y to A in step 426. Next, in step 428, A computes L by decrypting Y with her private key $PR_A$. Note that if user U that was selected was really A, then L is equivalent to K from step 416. Otherwise, L is a disparate set of random data. She then decrypts L with B's public key $PU_B$ yielding N and computes P by applying a one-way hash function to N. Finally, she computes the confirmation value $V_{AB}$ that could verify the shared, identity linked secret by concatenating the hash of $R_A$ with P and again applying a one-way hash function to the result.

In step 430, A and B execute a gradual release process in which they reveal $V_{AB}$ one bit at a time in an alternating fashion. The gradual release process is the key to accomplishing fairness in the presently presented protocol as neither party has an opportunity to gain more than a single bit advantage. Assuming a reasonable number of bits compose $V_{AB}$, A and B can be virtually guaranteed of a shared, identity linked secret between them upon successful completion of the process. On the other hand, if the process fails then no party gains any useful information.

Figure 5:
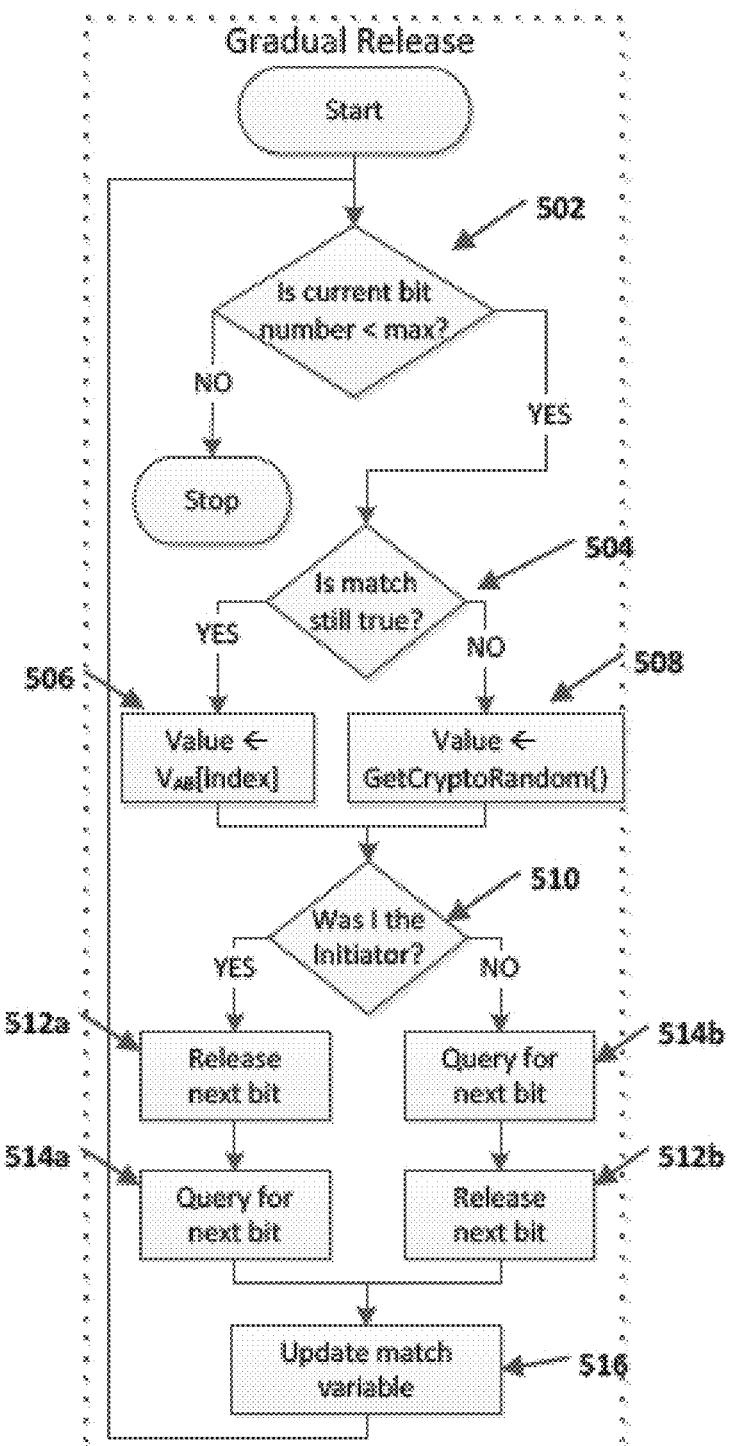
FIG. 5 is a flowchart illustrating a gradual release process in accordance with one embodiment of the present invention.

Referring now to FIG. 5, a flowchart illustrating a gradual release process 500 (an example of step 430 in FIG. 4) in accordance with one embodiment of the present invention is shown. The gradual release process 500 iteratively executes steps 502 through 516 until N bits have been released where N is the number of bits composing $V_{AB}$. In step 502, the process ends when N bits have been disclosed. Otherwise, if bits still remain, step 504 checks to see if all bits have correctly matched to this point. If the released bits have matched thus far, in step 506 the next bit value to be released is set to the next bit of $V_{AB}$ that the participant is responsible for releasing. But if the bits have failed to match at some point, a random bit is selected for the bit Value to disclose instead as represented in step 508. Continuing now to step 510, the order in which steps 512 and 514 are executed is opposite for initiator and non-initiator in the process. For the initiator, the next bit is released in step 512a after which 514a represent a query for the following bit. But for the non-initiator, 514b occurs first to query for the bit released by the initiator in 512a, after which the non-initiator's bit is released in 512b. After the release of the current pair of bits, in step 516, each participant updates her/his respective match variable based on whether or not the bit just released by the other participant was a match. The process then returns to step 502 to test the termination condition again (i.e., to see if all bits have been released).

A number of exemplary variations and enhancements are possible on the previously described method to achieve different security, privacy, and performance goals. For instance, consider the Gradual Release process of FIG. 5. The desired level of confidence may be able to be achieved with fewer than the maximum number of bits. Thus, for improved efficiency, Variation 1, which enhances the basic Gradual Release process to account for the desired level of confidence and minimize communication overhead, is expected applicable in many real world implementations.

Variation 1

Figure 6:
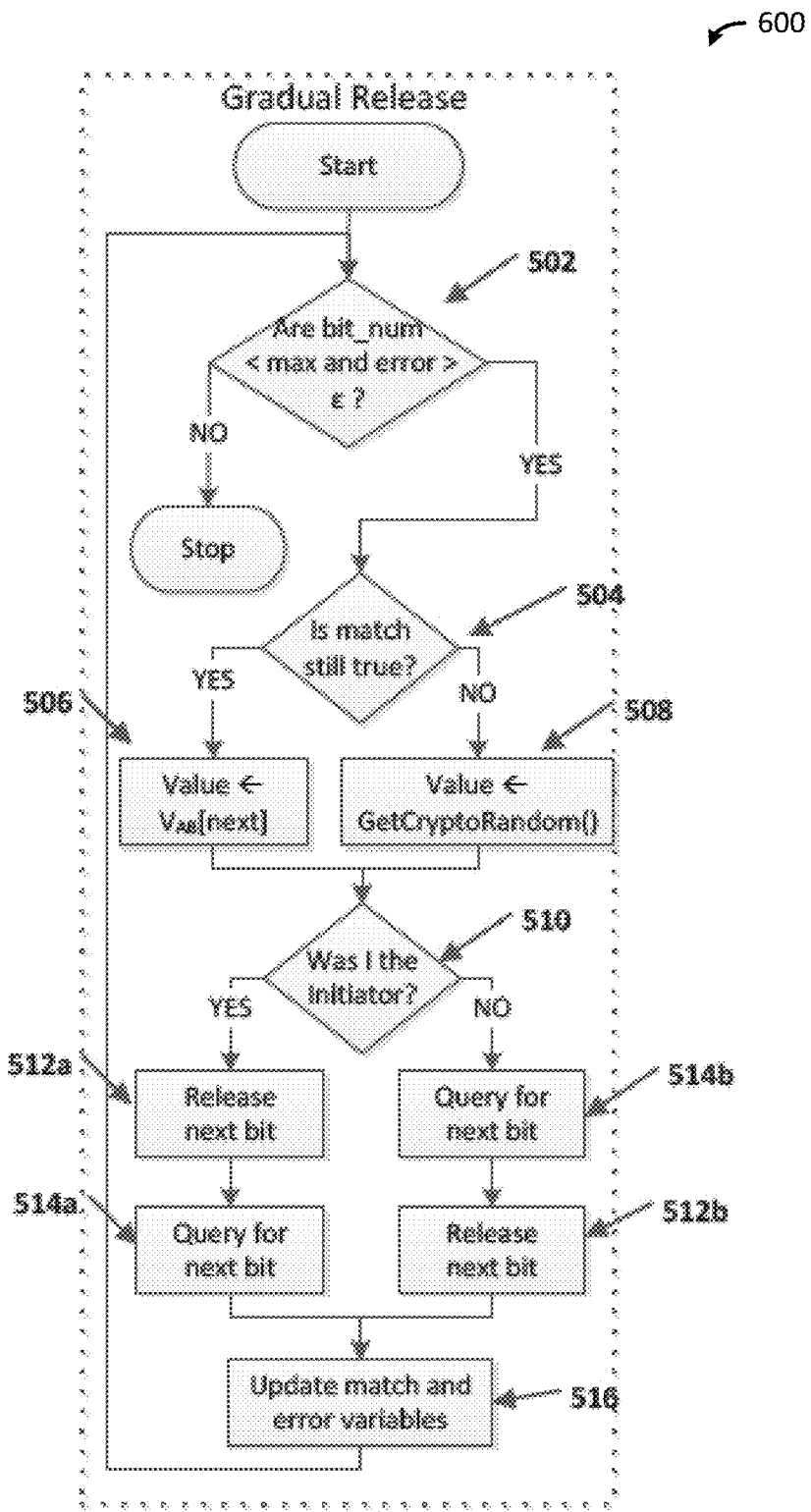
FIG. 6 is a flowchart illustrating a gradual release process in accordance with another embodiment of the present invention.

Now referring to FIG. 6, a flowchart illustrating a gradual release process 600 (an example of step 430 in FIG. 4) in accordance with another embodiment of the present invention is shown. The efficiency of the Gradual Release process of FIG. 5 can be improved by enhancing it to minimize the number of bits that must be released based on the desired level of confidence. That is, if Confidence equals one minus error (C=1–ε), then FIG. 6 represents how the process can be enhanced in this way. The Confidence of participants A and B relative to the number of bits N that have been released may be calculated as $[1-(0.5)^{\lceil N/2 \rceil}]$ and $(1-(0.5)^{\lfloor N/2 \rfloor})$ respectively (note that the difference is ceiling vs. floor of the N/2 exponent).

Variation 2

In step 424 of FIG. 4, rather than halting the process in the case of no response, the Server could reply to the user with a value indicating that there was no response.

Variation 3

The process could be extended to negotiate or specify the hash function or functions to be used.

Variation 4

If either party does not already know the public key of the other party, the algorithm could be extended to include a step for obtaining the necessary key(s).

Variation 5

The entire protocol can be further secured by using encrypted sessions between clients and the Server (i.e., between Alice and the Server and between Bob and the Server).

Variation 6

In step 422 of FIG. 4, in the event that there was no response at the time of the query, the user could repeat step 422 periodically thereafter until a response is received or for a pre-determined period of time.

Variation 7

Communications such as those in steps 408 and 422 of FIG. 4 could be either "pushed" from the Server to the Client or "pulled" by the Client with push/pull terminology conveying which party initiates the communication.

Variation 8

If used, authentication of users of the system can be simple for casual use (e.g., username and password).

Variation 9

If used, authentication of users of the system can be complex for situations needing higher security (e.g., biometrics, multi-factor authentication, location-based, etc.).

Variation 10

In steps 504-508 of the Gradual Release process of FIG. 5, the participant could halt communication upon the first non-matching bit rather than continuing with random decoy bits although doing so might be less secure in most circumstances.

Variation 11

A and B are not required to communicate with the Server in real-time or near real-time. The steps can occur asynchronously (e.g., over days, weeks, or more) with the server storing values for a predetermined period of time.

Variation 12

A temporal constraint on disclosure of the secret could be included. With regard to the embodiment presented in FIG. 4, in steps 402 through 406 Alice could select a temporal constraint and send it to the Server with the other values. For instance, she could indicate that the secret is valid for up to two weeks since "want to go to prom" would be irrelevant after the prom was over.

Variation 13

A geographic (location-based) constraint on disclosure of the secret could be included. With regard to the embodiment presented in FIG. 4, in steps 402 through 406 Alice could select a geographic constraint and send it to the Server with the other values.

Variation 14

The typical approach to choosing a random number would be to utilize a pseudo-random number generation algorithm (ideally cryptographically random) provided by the host operating system or programming language libraries. However, for inquiries regarding potentially shared secrets needing greater security, hardware-based random number generation techniques yielding truly random numbers might be used. Some examples of such mechanisms have a hardware-based component utilizing quantum effects or properties of the natural environment.

Variation 15

In step 412 of FIG. 4, Bob chose a single user with whom he might share secret S. Steps 412 through 418 could actually be repeated if there were multiple users with whom he felt he may share secret S (e.g., there may be multiple people he would like to go to prom with).

A number of variations are clearly possible (and necessary in some cases) based on the desired properties of the protocol and the level of security necessary for the context in which the system and method are being used. Non-limiting examples of factors that might impact those details include the nature of the secrets (e.g., a secret with major financial implications might need higher security than Alice and Bob inquiring about the prom), the computing capabilities or energy efficiency needs of the participants (e.g., client devices 102 of FIG. 1 could be mobile devices such as smartphones or smart-watches that have battery life or computational capability constraints), the computational capabilities of adversaries expected to attack the system, and so on.

Figure 7B:
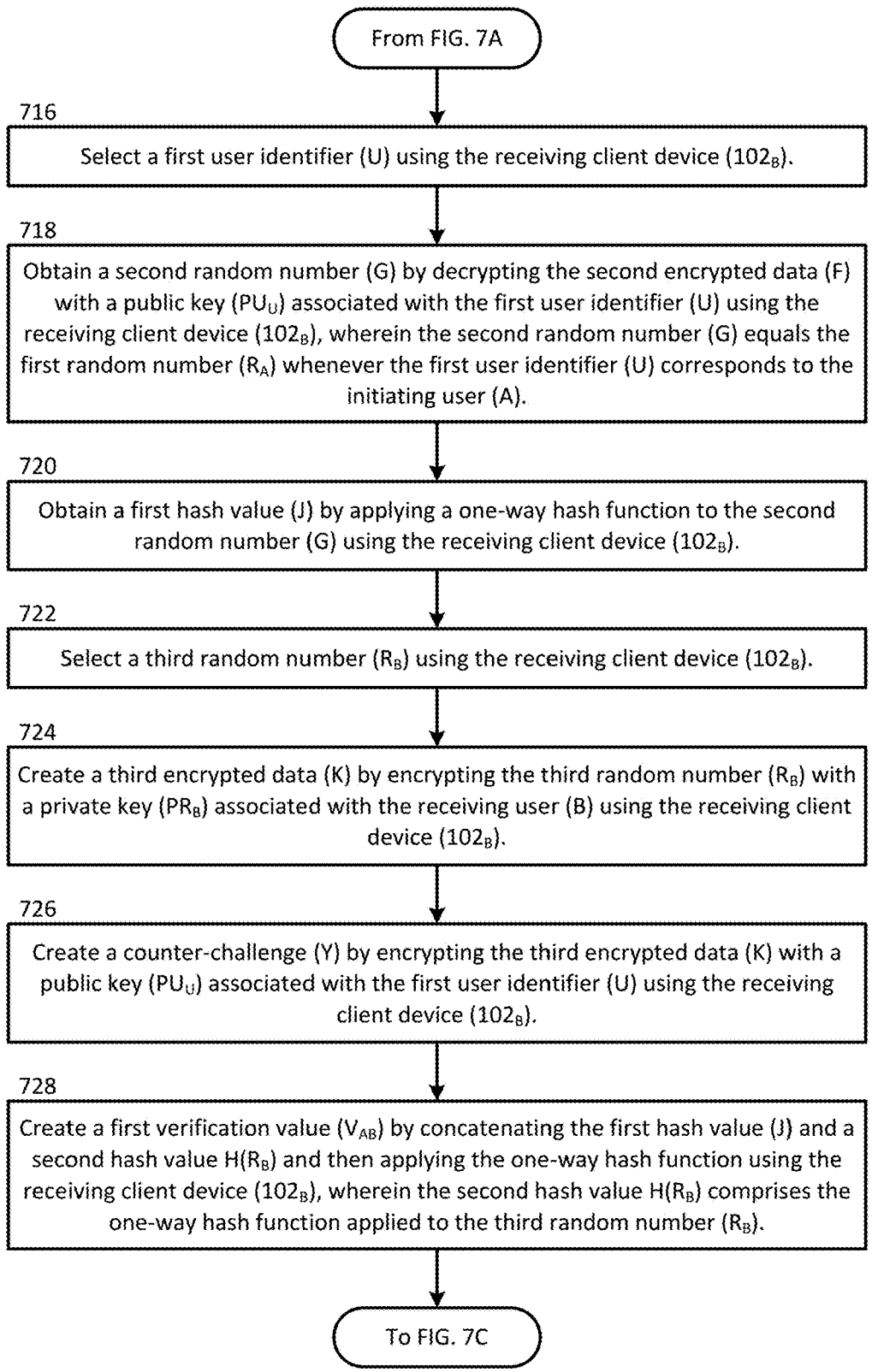
Figure 7C:
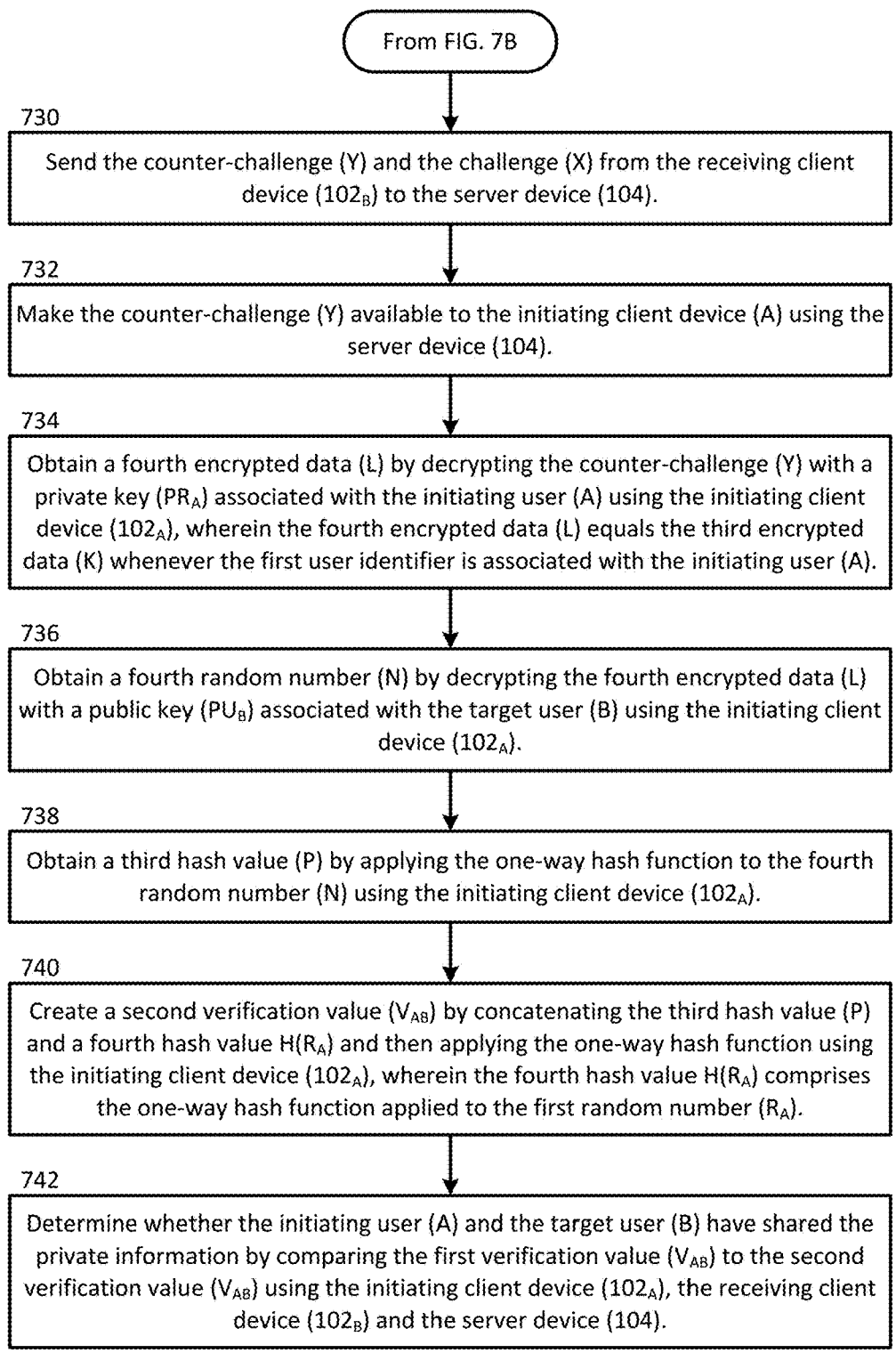

Referring now to FIGS. 7A-7C, a method 700 for disclosing private information (S) in accordance with another embodiment of the present invention is shown. A communications system is provided in block 702 comprising an initiating client device ($102_A$) and one or more receiving client devices ($102_B$) communicably coupled to a server device (104). Two or more user identifiers (IDs) and a first random number ($R_A$) are selected using the initiating client device ($102_A$) in block 704. The two or more user identifiers (IDs) include a target user (B). A first encrypted data (C) is created by encrypting the first random number ($R_A$) with a private key ($PR_A$) associated with the initiating user (A) using the initiating client device ($102_A$) in block 706. A challenge (X) is created by encrypting the first encrypted data (C) and the private information (S) with a public key ($PU_B$) associated with the target user (B) using the initiating client device ($102_A$) in block 708. The challenge (X) and the two or more user identifiers (IDs) are sent from the initiating client device ($102_A$) to the server device (104) in block 710. The challenge (X) is made available to each receiving client device ($102_B$) associated with the two or more user identifiers (IDs) using the server device (104) in block 712.

A first information (S?) and a second encrypted data (F) are obtained by decrypting the challenge (X) with a private key ($PR_B$) associated with a receiving user (B) using the receiving client device ($102_B$) in block 714. The first information (S?) equals the private information (S) whenever the receiving user (B) is the target user (B). A first user identifier (U) is selected using the receiving client device ($102_B$) in block 716. A second random number (G) is obtained by decrypting the second encrypted data (F) with a public key ($PU_U$) associated with the first user identifier (U) using the receiving client device ($102_B$) in block 718. The second random number (G) equals the first random number ($R_A$) whenever the first user identifier (U) corresponds to the initiating user (A). A first hash value (J) is obtained by applying a one-way hash function to the second random number (G) using the receiving client device ($102_B$) in block 720. A third random number ($R_B$) is selected using the receiving client device ($102_B$) in block 722. A third encrypted data (K) is created by encrypting the third random number ($R_B$) with a private key ($PR_B$) associated with the receiving user (B) using the receiving client device ($102_B$) in block 724. A counter-challenge (Y) is created by encrypting the third encrypted data (K) with a public key ($PU_U$) associated with the first user identifier (U) using the receiving client device ($102_B$) in block 726. A first verification value ($V_{AB}$) is created by concatenating the first hash value (J) and a second hash value $H(R_B)$ and then applying the one-way hash function using the receiving client device ($102_B$) in block 728. The second hash value $H(R_B)$ comprises the one-way hash function applied to the third random number ($R_B$).

The counter-challenge (Y) and the challenge (X) are sent from the receiving client device ($102_B$) to the server device (104) in block 730. The counter-challenge (Y) is made available to the initiating client device (A) using the server device (104) in block 732. A fourth encrypted data (L) is obtained by decrypting the counter-challenge (Y) with a private key ($PR_A$) associated with the initiating user (A) using the initiating client device ($102_A$) in block 734. The fourth encrypted data (L) equals the third encrypted data (K) whenever the first user identifier is associated with the initiating user (A). A fourth random number (N) is obtained by decrypting the fourth encrypted data (L) with a public key ($PU_B$) associated with the target user (B) using the initiating client device ($102_A$) in block 736. A third hash value (P) is obtained by applying the one-way hash function to the fourth random number (N) using the initiating client device ($102_A$) in block 738. A second verification value ($V_{AB}$) is created by concatenating the third hash value (P) and a fourth hash value $H(R_A)$ and then applying the one-way hash function using the initiating client device ($102_A$) in block 740. The fourth hash value $H(R_A)$ comprises the one-way hash function applied to the first random number ($R_A$). A determination as to whether the initiating user (A) and the target user (B) have shared the private information is made by comparing the first verification value ($V_{AB}$) to the second verification value ($V_{AB}$) using the initiating client device ($102_A$), the receiving client device ($102_B$) and the server device (104) in block 742.

In another embodiment, a system for disclosing private information (S), as shown in FIG. 1, includes an initiating client device ($102_A$) and one or more receiving client devices ($102_B$) communicably coupled to a server device (104). The initiating client device ($102_A$) selects two or more user identifiers (IDs) and a first random number ($R_A$) in which the two or more user identifiers (IDs) include a target user (B), creates a first encrypted data (C) by encrypting the first random number ($R_A$) with a private key ($PR_A$) associated with the initiating user (A), creates a challenge (X) by encrypting the first encrypted data (C) and the private information (S) with a public key ($PU_B$) associated with the target user (B), and sends the challenge (X) and the two or more user identifiers (IDs) to the server device (104). The server device (104) makes the challenge (X) available to each receiving client device ($102_B$) associated with the two or more user identifiers (IDs). The receiving client device ($102_B$) obtains a first information (S?) and a second encrypted data (F) by decrypting the challenge (X) with a private key ($PR_B$) associated with a receiving user (B) in which the first information (S?) equals the private information (S) whenever the receiving user (B) is the target user (B), selects a first user identifier (U), obtains a second random number (G) by decrypting the second encrypted data (F) with a public key ($PU_U$) associated with the first user identifier (U) in which the second random number (G) equals the first random number ($R_A$) whenever the first user identifier (U) corresponds to the initiating user (A), obtains a first hash value (J) by applying a one-way hash function to the second random number (G), selects a third random number ($R_B$), creates a third encrypted data (K) by encrypting the third random number ($R_B$) with a private key ($PR_B$) associated with the receiving user (B), creates a counter-challenge (Y) by encrypting the third encrypted data (K) with a public key ($PU_U$) associated with the first user identifier (U), creates a first verification value ($V_{AB}$) by concatenating the first hash value (J) and a second hash value $H(R_B)$ and then applying the one-way hash function in which the second hash value $H(R_B)$ comprises the one-way hash function applied to the third random number ($R_B$), and sends the counter-challenge (Y) and the challenge (X) to the server device (104). The server device (104) makes the counter-challenge (Y) available to the initiating client device (A). The initiating client device ($102_A$) obtains a fourth encrypted data (L) by decrypting the counter-challenge (Y) with a private key ($PR_A$) associated with the initiating user (A) in which the fourth encrypted data (L) equals the third encrypted data (K) whenever the first user identifier is associated with the initiating user (A), obtains a fourth random number (N) by decrypting the fourth encrypted data (L) with a public key ($PU_B$) associated with the target user (B), obtains a third hash value (P) by applying the one-way hash function to the fourth random number (N) using the initiating client device ($102_A$), creates a second verification value ($V_{AB}$) by concatenating the third hash value (P) and a fourth hash value $H(R_A)$ and then applying the one-way hash function in which the fourth hash value $H(R_A)$ comprises the one-way hash function applied to the first random number ($R_A$). The initiating client device ($102_A$), the receiving client device ($102_B$) and the server device (104) determine whether the initiating user (A) and the target user (B) have shared the private information by comparing the first verification value ($V_{AB}$) to the second verification value ($V_{A\bar{B}}$).

According to the disclosed embodiments of the invention, a method and system for privacy preserving disclosure of a shared secret with an untrusted third party are provided. The method and system overcomes major limitations of the prior art in the context of the Prom Problem and analogous situations thereby providing a novel secret disclosure service with applications in a broad range of fields.

Although the disclosed system and method have been presented primarily in the context of risk-free match-making as an example, and the market for that application of the innovation is substantial, the ramifications of the solution are much greater in magnitude. There are useful applications of the disclosed solution for the Prom Problem, a privacy-preserving method of disclosing shared secrets, in a variety of fields. The various embodiments of the disclosed method and system could be applied to produce valuable, tangible results in a broad and highly diverse set of instances such as with corporate M&A, in legislative negotiations and elections, and in human resources for tasks such as recruiting and salary negotiations. Moreover, it could remove much of the discomfort associated with most instances of buyer/seller negotiations such as in the automotive or real estate markets. The disclosed system and method would provide useful and tangible benefits in other circumstances. Hence, many other applications are possible.

While the above description contains many specificities, these should not be construed as limitations on the scope of any embodiment, but as exemplifications of the presently preferred embodiments thereof. Other ramifications and variations are possible within the teachings of the various embodiments.

Thus the scope of the invention should be determined by the claims of the subsequent regular patent application and their legal equivalents, and not by the examples given.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

The word "exemplary" is used herein to mean "serving as an example, instance, or illustration." Any embodiment described herein as "exemplary" is not necessarily to be construed as preferred or advantageous over other embodiments.

As used in this specification and claim(s), the words "comprising" (and any form of comprising, such as "comprise" and "comprises"), "having" (and any form of having, such as "have" and "has"), "including" (any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or items, such as BB, AAA, AB, BBC, AAABCCCC, CBBAAA, CABABB, and so forth. The skilled artisan will understand that typically there is not limit on the number of item or items in any combination, unless otherwise apparent from the context.

It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although preferred embodiments of the present invention have been described in detail, it will be understood by those skilled in the art that various modifications can be made therein without departing from the spirit and scope of the invention as set forth in the appended claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

REFERENCES

[1] Yao, A. Protocols for secure computation. In *Proceedings of the 23rd Annual IEEE Symposium on Foundations of Computer Science*, Chicago, 1982, pp. 160-164.

[2] Boudot, F., Schoenmakers, B., and Traore, J. A fair and efficient solution to the socialist millionaires' problem. *Discrete Applied Mathematics* 111, no. 1 (2001): 23-36.

[3] Du, W. and Atallah, M. J. Secure multi-party computation problems and their applications: a review and open problems. In *Proceedings of the 2001 workshop on New security paradigms*, pp. 13-22. ACM, 2001.

[4] Henecka, W., Sadeghi, A., Schneider, T., and Wehrenberg, I. TASTY: tool for automating secure two-party computations. In *Proceedings of the 17th ACM conference on Computer and communications security*, pp. 451-462. ACM, 2010.

[5] Aumann, Y. and Lindell, Y. Security Against Covert Adversaries: Efficient Protocols for Realistic Adversaries. *Journal of Cryptology* 23, 2 (April 2010), 281-343.

[6] Lindell, Y. and Pinkas, B. Secure two-party computation via cut-and-choose oblivious transfer. *Journal of cryptology* 25, no. 4 (2012): 680-722.

[7] Balfanz, D., Durfee, G., Shankar, N., Smetters, D., Staddon, J., and Wong, H. C. Secret handshakes from pairing-based key agreements. In *Security and Privacy, 2003. Proceedings. 2003 Symposium on*, pp. 180-196. IEEE, 2003.

[8] Rabin, M. O. How To Exchange Secrets with Oblivious Transfer. *IACR Cryptology ePrint Archive* 2005 (2005): 187.

[9] Patrick, K. N. Comparison of documents possessed by two parties. U.S. Pat. No. 8,032,747 B2, Oct. 4, 2011.

[10] Van Deventer, M. O., Veugen, P. J. M. and Klos, V. B. Shared secret verification method. European Patent 2120392 A1, Nov. 18, 2009.

[11] Baldwin, R. and Gramlich, W. C. Cryptographic protocol for trustable match making. In 2012 *IEEE Symposium on Security and Privacy*, pp. 92-92. IEEE Computer Society, 1985.

[12] Meadows, C. A more efficient cryptographic matchmaking protocol for use in the absence of a continuously available third party. In 2012 *IEEE Symposium on Security and Privacy*, pp. 134-134. IEEE Computer Society, 1986.

[13] Lee, B. and Kim, K. Secure matchmaking protocol. In *Information Security and Cryptology—ICISC* 2000, pp. 123-134. Springer Berlin Heidelberg, 2001.

[14] Zhang, K. and Needham, R. A private matchmaking protocol. 2001. Available at http://citeseerx.ist.psu.edu/viewdoc/summary?doi=10.1.1.54.835.

[15] Atallah, M. J. and Cho, Y. Private Discovery of Shared Interests☐. In *Proceedings 9th International Conference on Information and Communications Security (ICICS '07)*, Zhengzhou, China, 2007.

[16] Shin, J. S. and Gligor, V. D. A new privacy-enhanced matchmaking protocol. In *IEICE Transactions on Communications* 96, no. 8 (2013): 2049-2059.

What is claimed is:

1. A method for disclosing a private information comprising:

providing a communications system comprising an initiating client device and one or more receiving client devices communicably coupled to a server device;

selecting two or more user identifiers and a first random number using the initiating client device, wherein the two or more user identifiers include a target user;

creating a first encrypted data by encrypting the first random number with a private key associated with the initiating user using the initiating client device;

creating a challenge by encrypting the first encrypted data and the private information with a public key associated with the target user using the initiating client device;

sending the challenge and the two or more user identifiers from the initiating client device to the server device;

making the challenge available to each receiving client device associated with the two or more user identifiers using the server device;

obtaining a first information and a second encrypted data by decrypting the challenge with a private key associated with a receiving user using the receiving client device, wherein the first information equals the private information whenever the receiving user is the target user;

selecting a first user identifier using the receiving client device;

obtaining a second random number by decrypting the second encrypted data with a public key associated with the first user identifier using the receiving client device, wherein the second random number equals the first random number whenever the first user identifier corresponds to the initiating user;

obtaining a first hash value by applying a one-way hash function to the second random number using the receiving client device;

selecting a third random number using the receiving client device;

creating a third encrypted data by encrypting the third random number with a private key associated with the receiving user using the receiving client device;

creating a counter-challenge by encrypting the third encrypted data with a public key associated with the first user identifier using the receiving client device;

creating a first verification value by concatenating the first hash value and a second hash value and then applying the one-way hash function using the receiving client device, wherein the second hash value comprises the one-way hash function applied to the third random number;

sending the counter-challenge and the challenge from the receiving client device to the server device;

making the counter-challenge available to the initiating client device using the server device;

obtaining a fourth encrypted data by decrypting the counter-challenge with a private key associated with the initiating user using the initiating client device, wherein the fourth encrypted data equals the third encrypted data whenever the first user identifier is associated with the initiating user;

obtaining a fourth random number by decrypting the fourth encrypted data with a public key associated with the target user using the initiating client device;

obtaining a third hash value by applying the one-way hash function to the fourth random number using the initiating client device;

creating a second verification value by concatenating the third hash value and a fourth hash value and then applying the one-way hash function using the initiating client device, wherein the fourth hash value comprises the one-way hash function applied to the first random number; and determining whether the initiating user and the target user have shared the private information by comparing the first verification value to the second verification value using the initiating client device, the receiving client device and the server device.

2. The method as recited in claim 1, wherein comparing the first verification value to the second verification value is performed using a gradual release process.

3. The method as recited in claim 2, wherein the gradual release process comprises the initiating client device revealing the second verification value to the receiving client device and the receiving client device revealing the first verification value to initiating client device in a bit-by-bit exchange process.

4. The method as recited in claim 3, further comprising substituting a random bit for a next bit of the first verification value or the second verification value to be sent whenever a received bit does not match.

5. The method as recited in claim 3, further comprising halting the bit-by-bit exchanged process whenever a received bit does not match.

6. The method as recited in claim 3, wherein not all of the bits in the first verification value and the second verification value are exchanged whenever a confidence factor is satisfied.

7. The method as recited in claim 1, wherein the two or more user identifiers are selected by selecting a group of user identifiers.

8. The method as recited in claim 1, wherein the server device makes the challenge available to each receiving client device by the server device sending or pushing the challenge to the receiving client device, or the receiving client device retrieving or pulling the challenge from the server device, or a combination thereof.

9. The method as recited in claim 1, wherein the server device stores the challenge only for a specified time period or until a trigger event occurs.

10. The method as recited in claim 1, wherein the server device makes the counter-challenge available to initiating client device by the server device sending or pushing the counter-challenge to the initiating client device, or the initiating client device retrieving or pulling the counter-challenge from the server device, or a combination thereof.

11. The method as recited in claim 10, wherein the server device sends or pushes the counter-challenge to the initiating client device upon receipt of a query from the initiating client device.

12. The method as recited in claim 10, further comprising periodically repeating the query for a specified time period or until a counter-challenge is received.

13. The method as recited in claim 1, further comprising sending a message from the server device to the initiating client device indicating that no responses to the challenge were received.

14. The method as recited in claim 1, further comprising negotiating or selecting the one-way hash function.

15. The method as recited in claim 1, further comprising obtaining the public key associated with the target user or the public key associated with the first user identifier.

16. The method as recited in claim 1, further comprising encrypting the communications between the initiating client device and the server device, and the receiving client device and the server device.

17. The method as recited in claim 1, further comprising authenticating the initiating user using the initiating client device and/or the server device, and authenticating the receiving user using the receiving client device or the server device.

18. The method as recited in claim 17, wherein the initiating user and/or the receiving user are authenticated using a user name and a password, or a biometric identifier, or a multi-factor authentication, or a location-based identifier, or a combination thereof.

19. The method as recited in claim 1, wherein the communications between the initiating client device and the server device, and the receiving client device and the server device are not performed in real-time or near real-time.

20. The method as recited in claim 1, further comprising selecting a temporal constraint on the private information using the initiating client device and sending the temporal constraint from the initiating client device to the server device.

21. The method as recited in claim 1, further comprising selecting a geographic constraint on the private information using the initiating client device and sending the geographic constraint from the initiating client device to the server device.

22. The method as recited in claim 1, wherein the first, second, third and fourth random numbers are generated using a pseudo-random number generator or a cryptographically secure pseudo-random number generator or a hardware-based random number generator.

23. The method as recited in claim 1, further comprising creating additional counter-challenge(s) for one or more other selected users.

24. The method as recited in claim 1, further comprising negotiating or selecting a length of the private key or the public key.

25. The method as recited in claim 1, further comprising negotiating or selecting a random number generator to generate the first, second, third and fourth random numbers.

26. A system for disclosing a private information comprising:
an initiating client device;
one or more receiving client devices communicably coupled to a server device;
the initiating client device selects two or more user identifiers and a first random number in which the two or more user identifiers include a target user, creates a first encrypted data by encrypting the first random number with a private key associated with the initiating user, creates a challenge by encrypting the first encrypted data and the private information with a public key associated with the target user, and sends the challenge and the two or more user identifiers to the server device;
the server device makes the challenge available to each receiving client device associated with the two or more user identifiers;
the receiving client device obtains a first information and a second encrypted data by decrypting the challenge with a private key associated with a receiving user in which the first information equals the private information whenever the receiving user is the target user, selects a first user identifier, obtains a second random number by decrypting the second encrypted data with a public key associated with the first user identifier in which the second random number equals the first random number whenever the first user identifier corresponds to the initiating user, obtains a first hash value by applying a one-way hash function to the second random number, selects a third random number, creates a third encrypted data by encrypting the third random number with a private key associated with the receiving user, creates a counter-challenge encrypting the third encrypted data with a public key associated with the first user identifier, creates a first verification value by concatenating the first hash value and a second hash value and then applying the one-way hash function in which the second hash value comprises the one-way hash function applied to the third random number, and sends the counter-challenge and the challenge to the server device;
the server device makes the counter-challenge available to the initiating client device;

the initiating client device obtains a fourth encrypted data by decrypting the counter-challenge with a private key associated with the initiating user in which the fourth encrypted data equals the third encrypted data whenever the first user identifier is associated with the initiating user, obtains a fourth random number by decrypting the fourth encrypted data with a public key associated with the target user, obtains a third hash value by applying the one-way hash function to the fourth random number using the initiating client device, creates a second verification value by concatenating the third hash value and a fourth hash value and then applying the one-way hash function in which the fourth hash value comprises the one-way hash function applied to the first random number; and the initiating client device, the receiving client device and the server device determine whether the initiating user and the target user have shared the private information by comparing the first verification value to the second verification value.

27. The system as recited in claim 26, wherein the first verification value is compared to the second verification value using a gradual release process.

28. The system as recited in claim 27, wherein the gradual release process comprises the initiating client device revealing the second verification value to the receiving client device and the receiving client device revealing the first verification value to initiating client device in a bit-by-bit exchange process.

29. The system as recited in claim 28, wherein a random bit is substituted for a next bit of the first verification value or the second verification value to be sent whenever a received bit does not match.

30. The system as recited in claim 28, wherein the bit-by-bit exchange process is halted whenever a received bit does not match.

31. The system as recited in claim 28, wherein not all of the bits in the first verification value and the second verification value are exchanged whenever a confidence factor is satisfied.

32. The system as recited in claim 27, wherein the two or more user identifiers are selected by selecting a group of user identifiers.

33. The system as recited in claim 27, wherein the server device makes the challenge available to each receiving client device by the server device sending or pushing the challenge to the receiving client device, or the receiving client device retrieving or pulling the challenge from the server device, or a combination thereof.

34. The system as recited in claim 27, wherein the server device stores the challenge only for a specified time period or until a trigger event occurs.

35. The system as recited in claim 27, wherein the server device makes the counter-challenge available to initiating client device by the server device sending or pushing the counter-challenge to the initiating client device, or the initiating client device retrieving or pulling the counter-challenge from the server device, or a combination thereof.

36. The system as recited in claim 35, wherein the server device sends or pushes the counter-challenge to the initiating client device upon receipt of a query from the initiating client device.

37. The system as recited in claim 35, wherein the query is periodically repeated for a specified time period or until a counter-challenge is received.

38. The system as recited in claim 27, wherein the server device sends a message to the initiating client device indicating that no responses to the challenge were received.

39. The system as recited in claim 27, wherein the one-way hash function is negotiated or selected.

40. The system as recited in claim 27, further comprising obtaining the public key associated with the target user or the public key associated with the first user identifier.

41. The system as recited in claim 27, wherein the communications between the initiating client device and the server device, and the receiving client device and the server device are encrypted.

42. The system as recited in claim 27, wherein the initiating client device and/or the server device authenticate the initiating user using, and the receiving client device or the server device authenticates the receiving user.

43. The system as recited in claim 42, wherein the initiating user and/or the receiving user are authenticated using a user name and a password, or a biometric identifier, or a multi-factor authentication, or a location-based identifier, or a combination thereof.

44. The system as recited in claim 27, wherein the communications between the initiating client device and the server device, and the receiving client device and the server device are not performed in real-time or near real-time.

45. The system as recited in claim 27, wherein the initiating client device selects a temporal constraint on the private information and sends the temporal constraint from the initiating client device to the server device.

46. The system as recited in claim 27, wherein the initiating client device selects a geographic constraint on the private information and sends the geographic constraint from the initiating client device to the server device.

47. The system as recited in claim 27, wherein the first, second, third and fourth random numbers are generated using a pseudo-random number generator or a cryptographically secure pseudo-random number generator or a hardware-based random number generator.

48. The system as recited in claim 27, wherein additional counter-challenge(s) for one or more other selected users are created.

49. The system as recited in claim 27, wherein a length of the private key or the public key is negotiated or selected.

50. The system as recited in claim 27, wherein a random number generator to generate the first, second, third and fourth random numbers is negotiated or selected.

* * * * *